United States Patent
Heyerman et al.

(10) Patent No.: US 8,313,293 B2
(45) Date of Patent: Nov. 20, 2012

(54) TURBOFAN MOUNTING SYSTEM

(75) Inventors: Jeffrey Bernard Heyerman, Oakville (CA); Bryan W. Olver, Nobleton (CA); Bruce Fielding, Glen Williams (CA); Carl Smythe, Brampton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 617 days.

(21) Appl. No.: 12/466,426

(22) Filed: May 15, 2009

(65) Prior Publication Data

US 2010/0290903 A1    Nov. 18, 2010

(51) Int. Cl.
*F01D 25/28* (2006.01)
(52) U.S. Cl. .............. 415/213.1; 248/554; 248/555; 60/226.1; 60/796
(58) Field of Classification Search ............... 60/226.1, 60/796, 797; 415/209.1, 215, 213.1, 215.1; 248/554, 555; 244/54
See application file for complete search history.

(56) References Cited

U.S. PATENT DOCUMENTS

| | | |
|---|---|---|
| 2,936,978 A | 5/1960 | Lauck |
| 3,397,855 A * | 8/1968 | Newland ............ 248/554 |
| 4,013,246 A | 3/1977 | Nightingale |
| 4,266,741 A | 5/1981 | Murphy |
| 4,326,682 A * | 4/1982 | Nightingale ............ 244/54 |
| 4,471,609 A | 9/1984 | Porter et al. |
| 4,603,821 A | 8/1986 | White |
| 4,603,822 A | 8/1986 | Chee |
| 4,766,723 A | 8/1987 | Newton |
| 4,979,872 A | 12/1990 | Myers et al. |
| 5,088,279 A * | 2/1992 | MacGee ............ 60/226.1 |
| 5,174,525 A | 12/1992 | Schilling |
| 5,190,245 A | 3/1993 | Debeneix |
| 5,222,360 A | 6/1993 | Antuna et al. |
| 5,226,288 A | 7/1993 | Cornax |
| 5,259,183 A | 11/1993 | Debeneix |
| 5,277,382 A | 1/1994 | Seelen et al. |
| 5,351,930 A | 10/1994 | Gwinn et al. |
| 5,428,952 A | 7/1995 | Jewess |
| 5,443,229 A | 8/1995 | O'Brien et al. |
| 5,452,575 A | 9/1995 | Freid |
| 5,524,847 A | 6/1996 | Brodell et al. |
| 5,746,391 A | 5/1998 | Rodgers et al. |
| 5,791,138 A | 8/1998 | Lillibridge et al. |
| 5,860,275 A | 1/1999 | Newton et al. |
| 5,860,623 A | 1/1999 | Dunstan et al. |
| 5,873,547 A | 2/1999 | Dunstan |
| 6,547,518 B1 | 4/2003 | Czachor et al. |
| 6,619,030 B1 | 9/2003 | Seda et al. |
| 6,708,482 B2 | 3/2004 | Seda |
| 6,883,303 B1 | 4/2005 | Seda |
| 6,935,591 B2 | 8/2005 | Udall |
| 6,976,655 B2 | 12/2005 | Thompson |

(Continued)

FOREIGN PATENT DOCUMENTS

EP    1247944    10/2002

(Continued)

*Primary Examiner* — Edward Look
*Assistant Examiner* — Jason Davis
(74) *Attorney, Agent, or Firm* — Norton Rose Canada LLP (57) ABSTRACT

A gas turbine engine has a rear mounting assembly incorporating a mounting apparatus attached to a bypass duct wall with a link device for transferring core portion related inertia-induced loads, from an MTF of the core portion in a short circuit across an annular bypass air passage to the bypass duct wall.

17 Claims, 8 Drawing Sheets

U.S. PATENT DOCUMENTS

| | | |
|---|---|---|
| 7,232,091 B2 | 6/2007 | Marche |
| 7,296,414 B2 | 11/2007 | Stretton et al. |
| 7,313,920 B2 | 1/2008 | Stretton et al. |
| 2005/0230532 A1 | 10/2005 | Stretton et al. |
| 2008/0014084 A1 | 1/2008 | Eleftheriou et al. |
| 2008/0031727 A1 | 2/2008 | Sjoqvist |
| 2008/0073460 A1 | 3/2008 | Beardsley et al. |

FOREIGN PATENT DOCUMENTS

| | | |
|---|---|---|
| EP | 1340902 | 9/2003 |
| GB | 1222902 | 2/1971 |
| GB | 2021696 | 12/1979 |

* cited by examiner

TURBOFAN MOUNTING SYSTEM

TECHNICAL FIELD

The application relates generally to gas turbine engines and more particularly, to a turbofan engine mounting system.

BACKGROUND OF THE ART

Figure 9:
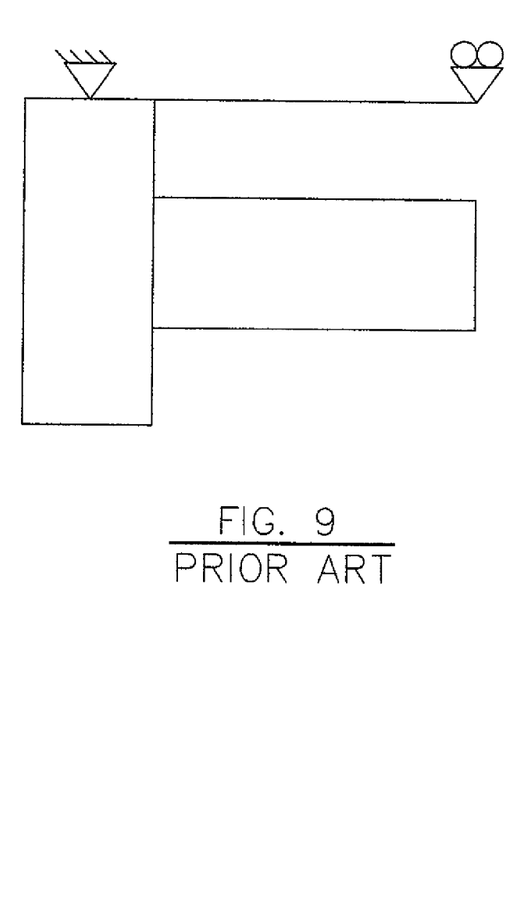
FIG. 9 is a schematic illustration of a prior art turbofan gas turbine engine mounting system, showing a cantilever core portion.
Figure 10:
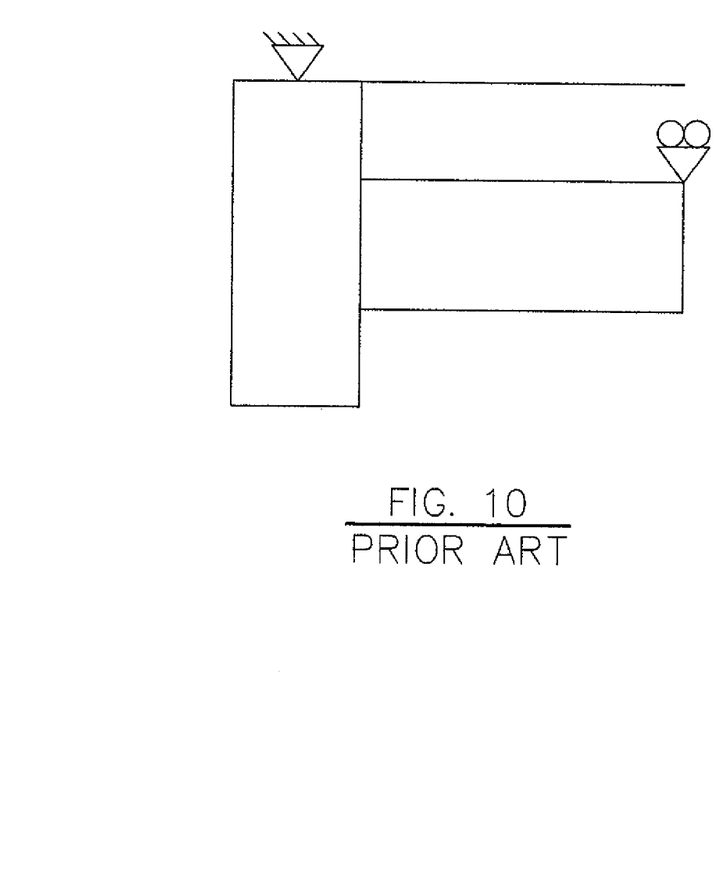
FIG. 10 is a schematic illustration of a prior art turbofan gas turbine engine mounting system, showing a rear core portion mount.

A turbofan gas turbine engine basically includes a core portion which must be mounted inside a bypass duct. A traditional engine mount system for a fuselage mount turbofan gas turbine engine reacts to thrust, lateral and vertical loads at the front mounting plane (on the intermediate case of the engine), and reacts to lateral and vertical loads at the rear mount. The rear mount is usually located either on the bypass duct, forming a cantilever core as schematically shown in FIG. 9, or on the engine core, typically near the turbine exhaust case, forming a rear core mount as schematically shown in FIG. 10. However, the cantilever core suffers from distortion due to inertia loads and tends to droop from the burden of these loads, particularly in so-called a long duct mixed flow (LDMF) turbofan gas turbine engines, resulting in tip clearance loss which is critical to the functioning of an axial compressor. The rear core mount suffers from significant bending of the core portion caused by thrust loads. The rear mount carries a load due to a moment created by the engine thrust line of action being offset from the thrust reaction plane. Thus, the core portion is loaded analogous to a simply supported beam with a point moment located at the front mount plane. This effect is critical, particularly on an axial compressor, since the maximum deflection occurs at the rear compressor stages, where small tip clearances are needed to maintain engine operability.

Accordingly, there is a need to provide an improved mounting system for turbofan gas turbine engines.

SUMMARY

In one aspect, a turbofan gas turbine engine comprises: a front mounting assembly attached to an annular bypass duct wall at a front axial position close to an inlet of a bypass air passage defined radially between the bypass duct wall and a core portion of the engine, the core portion being supported within the bypass duct wall by the front mounting assembly; and a rear mounting assembly having a mounting apparatus attached to the bypass duct wall at a rear axial position adjacent to an outlet of the bypass air passage, the rear mounting assembly including a plurality of rods having opposed inner and outer ends, the rods lying substantially tangential to the core portion of the engine and extending across the bypass air passage, the rods interconnecting the bypass duct wall and a mid turbine frame (MTF) of the core portion.

In another aspect, a turbofan gas turbine engine comprises a core portion including at least first and second turbine assemblies, and a mid turbine frame (MTF) positioned axially between the first and second turbine assemblies; an annular bypass duct wall surrounding and supporting the core portion, to thereby define a bypass air passage radially between the core portion and the bypass duct for directing a bypass air flow passing therethrough; and means for transferring core portion related inertia-induced loads from the MTF in a short circuit across the bypass air passage in a radial plane defined by the MTF to the bypass duct wall, thereby reducing distortion of the core portion caused by the inertia-induced loads and reducing carcass bending of the core portion.

Further details of these and other aspects of the concept will be apparent from the detailed description and figures included below.

DESCRIPTION OF THE DRAWINGS

Reference is now made to the accompanying drawings, in which.

DETAILED DESCRIPTION OF THE PREFERRED EMBODIMENTS

Figure 1:
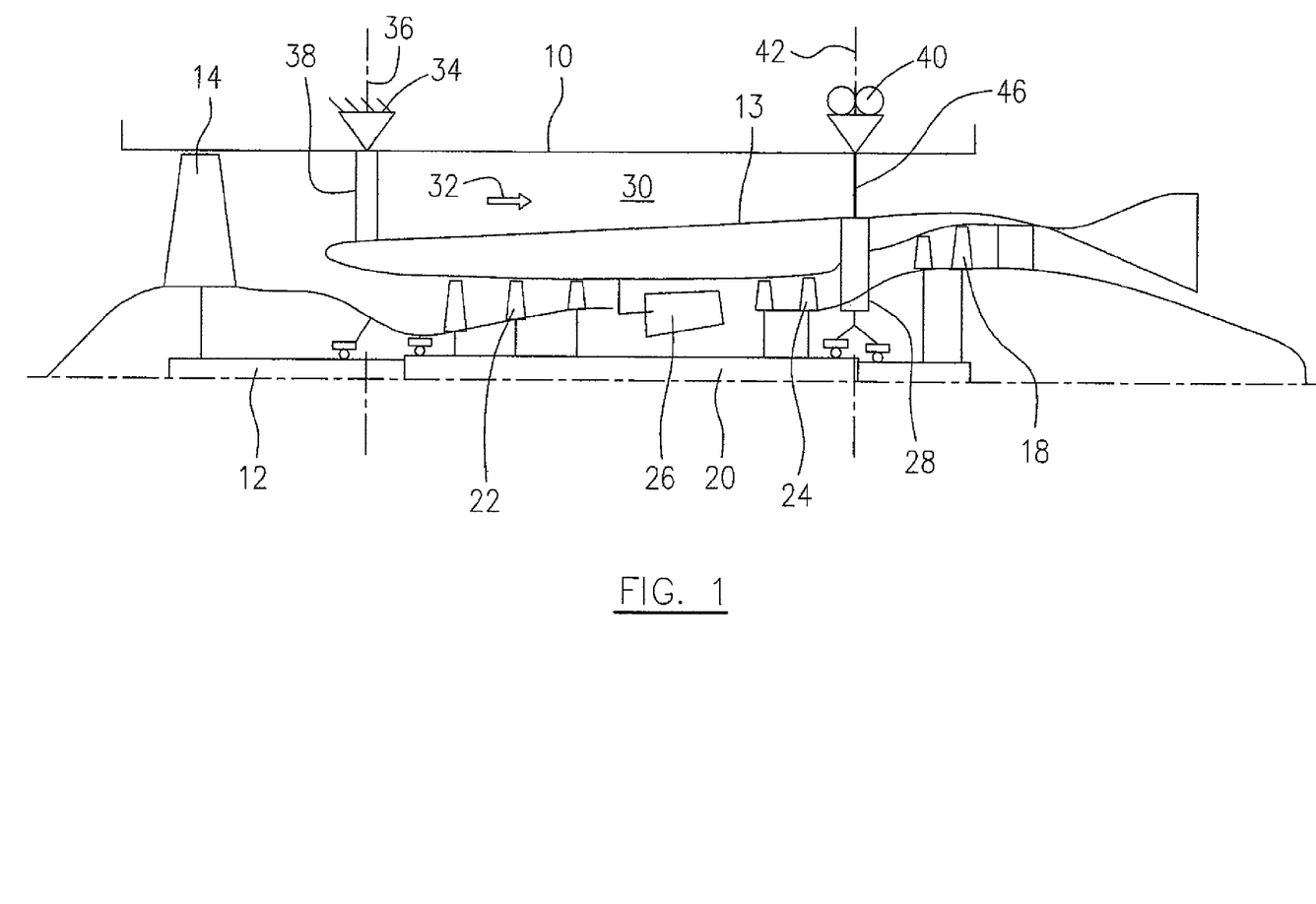
FIG. 1 is a schematic cross-sectional view of a turbofan gas turbine engine as an exemplary application of the describe subject matter.

Referring to FIG. 1 a long duct mixed flow (LDMF) turbofan gas turbine engine (not numbered) includes an annular bypass duct wall 10, a low pressure spool assembly (not numbered) which includes a fan assembly 14 and a low pressure turbine assembly 18 connected by a shaft 12, and a high pressure spool assembly (not numbered) which includes a high pressure compressor assembly 22 and a high pressure turbine assembly 24 connected by a shaft 20. A core portion 13 accommodates the high pressure compressor 22 and the low and high pressure turbine assemblies 18, 24, to define a main fluid path (not numbered) therethrough. In the main fluid path there is provided a combustor 26 to generate combustion gases to power the high and low pressure turbine assemblies 24, 18. A mid turbine frame (MTF) 28 as part of the core portion 13 is disposed between the high and low pressure turbine assemblies 24 and 18. The core portion 13 is coaxially positioned within the annular bypass duct wall 10 and an annular bypass air passage 30 is defined radially between the annular bypass duct wall 10 and the core portion 13 of the engine for directing a bypass air flow 32 driven by the fan assembly 14, to pass therethrough.

Referring to FIGS. 1-5, a front mounting assembly 34 is attached to the annular bypass duct wall 10 at a front axial position indicated by line 36 (representing a front mounting plane) located close to an inlet (not numbered) of the annular bypass air passage 30, to mount the engine to an aircraft (not shown). Radial struts 38 are provided near the axial location of the front mounting plane 36 and extend between the bypass duct wall 10 and the core portion 13 to support the core portion within the bypass duct 10, transferring thrust, lateral and vertical loads to the front mounting assembly 34.

A rear mounting assembly 40 is also attached to the annular bypass duct wall 10 at a rear axial position indicated by line 42 (representing a rear mounting plane), close to an outlet (not numbered) of the bypass air passage 30. The rear mounting assembly 40 includes a plurality of circumferentially spaced apart connecting brackets 44 which are attached to the bypass duct wall 10, and a plurality of link rods 46 having opposed inner and outer ends (not numbered), extending across the annular bypass air passage 30, and substantially tangential to the core portion 13 of the engine. Each link rod 46 is connected at the outer end thereof to the bypass duct wall 10 by means of connecting brackets 44 and is attached at the inner end thereof to the MTF 28 of the core portion 13.

The link rods 46 include a first group in which each rod 46a extends from the outer end to the inner end thereof in a substantially tangential direction to the core portion 13 corresponding to a first circumferential direction 48a, and a second group in which each link rod 46b extends from the outer end to the inner end thereof in a substantially tangential direction to the core portion 13 corresponding to a second circumferential direction 48b opposite to the first circumferential direction 48a.

Figure 2:
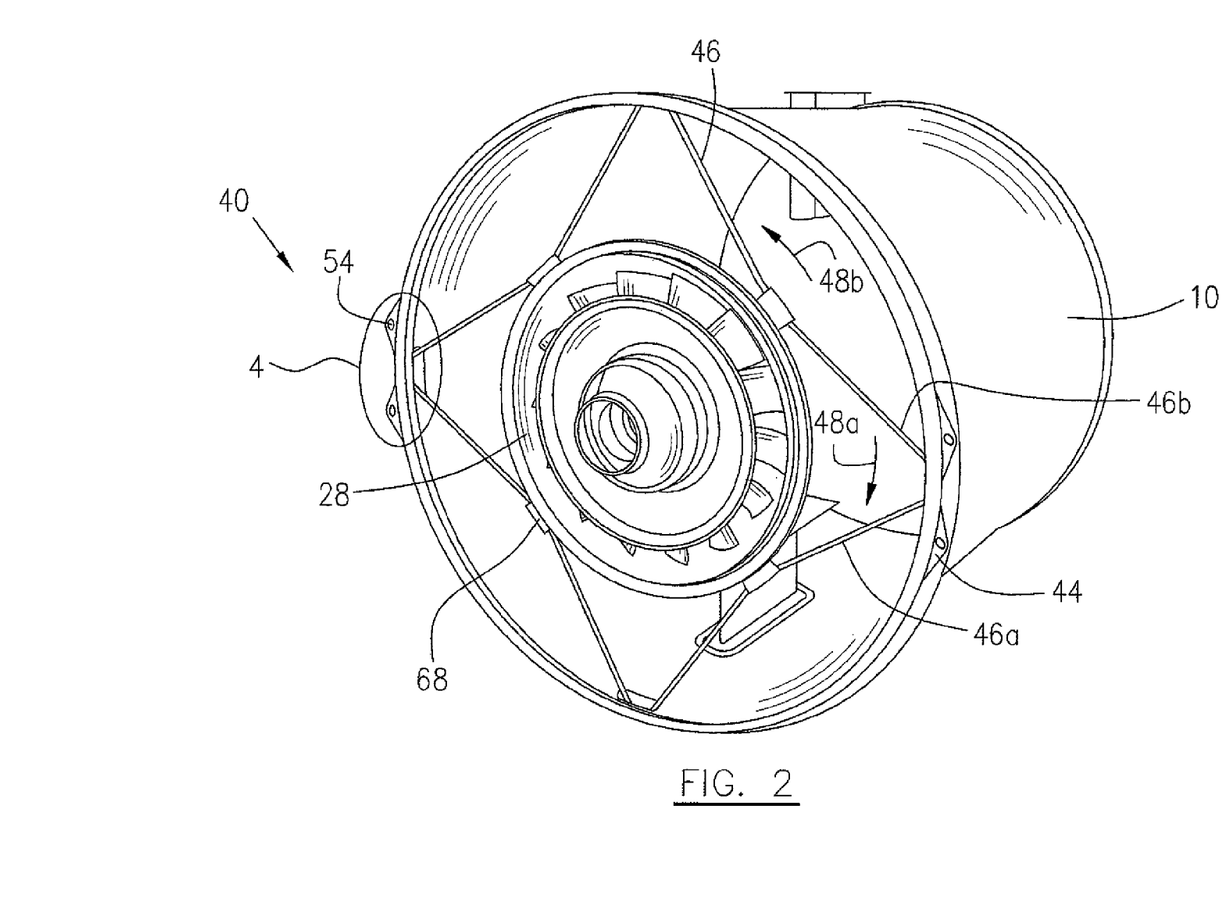
FIG. 2 is a perspective view of a rear mounting assembly according to one embodiment, as used in the engine of FIG. 1.
Figure 3:
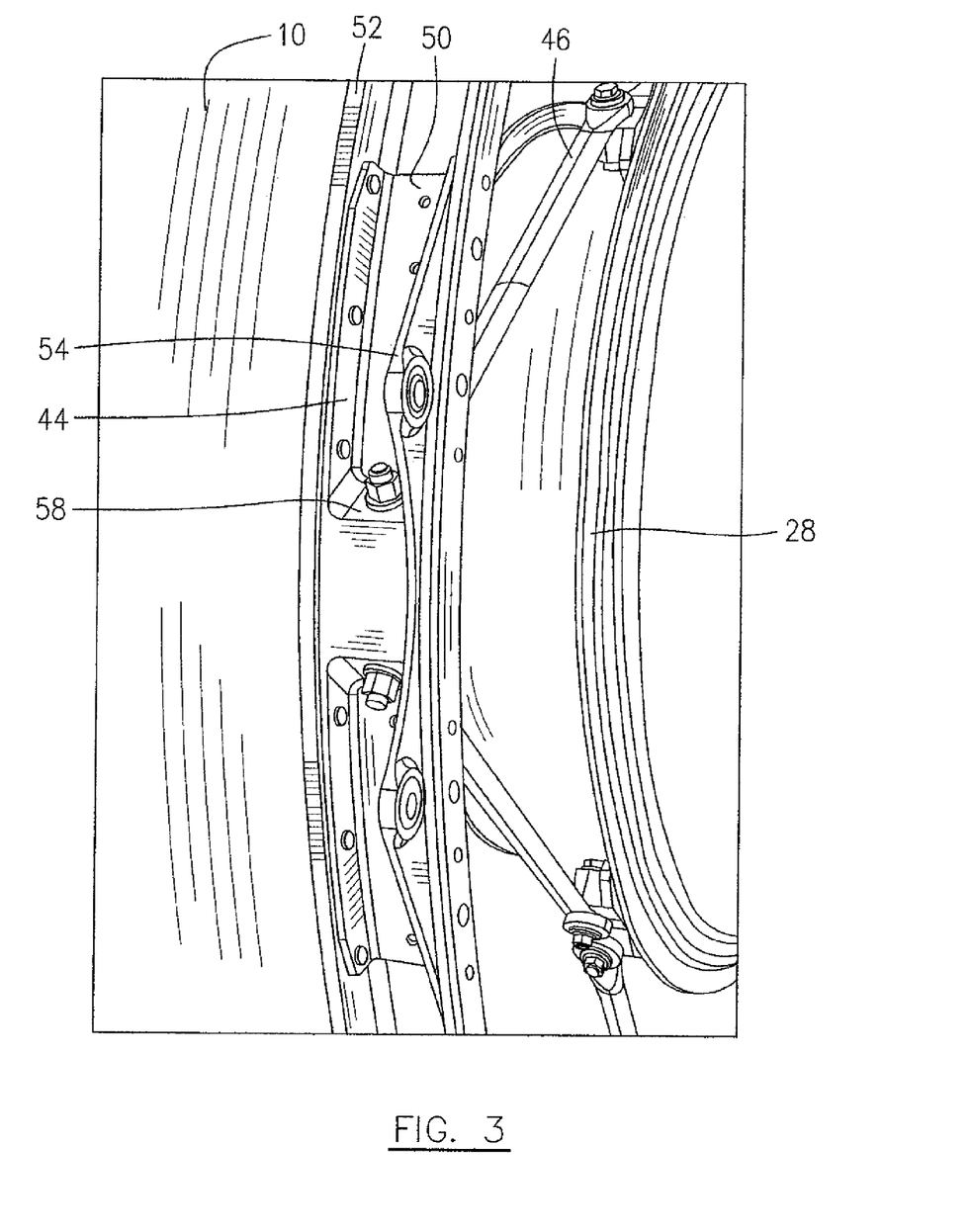
FIG. 3 is a partial perspective view of the rear mounting assembly of FIG. 2 in an enlarged portion, showing one of the connecting brackets with a mounting portion.
Figure 4:
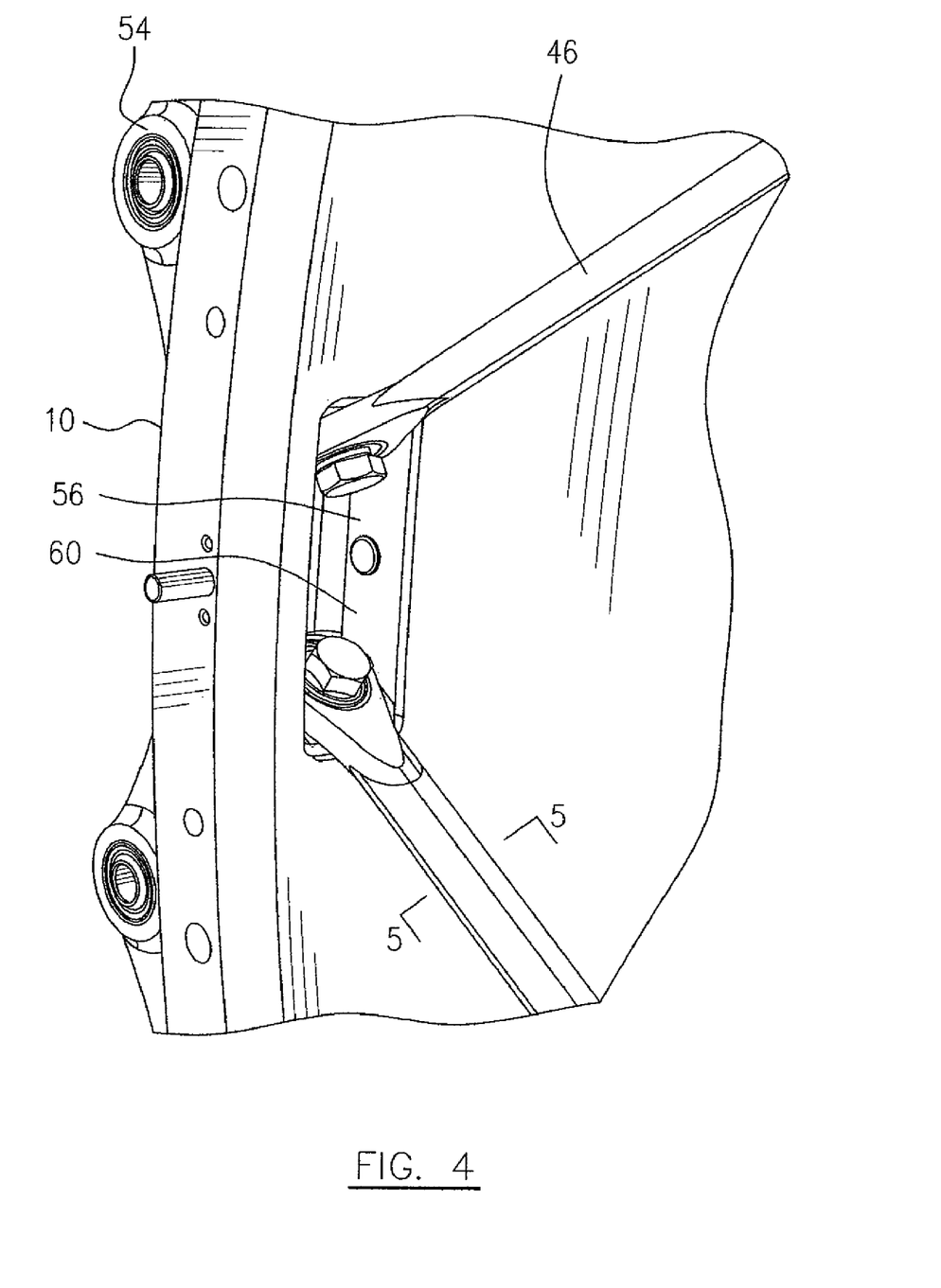
FIG. 4 is a partial perspective view of the circled area 4 of the rear mounting assembly of FIG. 2, looking into the inside surface of a bypass duct wall in an enlarged scale, showing the attachment of link rods to the connecting brackets.
Figure 5:
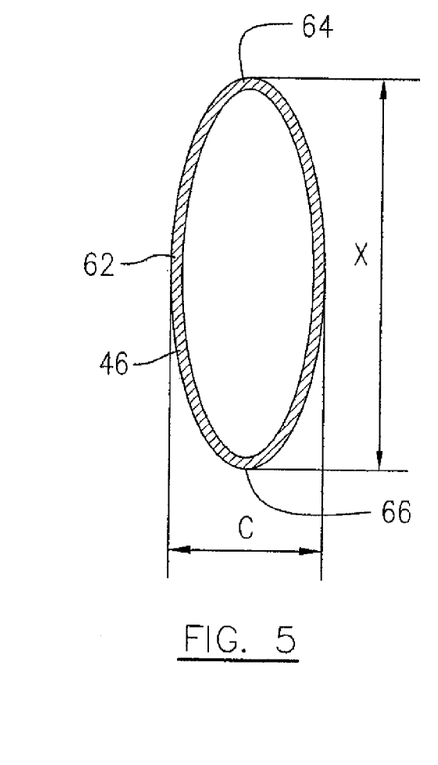
FIG. 5 is a cross-sectional view of the link rod taken along line 5-5 in FIG. 4, showing the aerodynamic profile of the link rod.

Each of the connecting brackets 44 according to this embodiment, is connected with two adjacent link rods 46, i.e. one link rod 46a in the first group and the other link rod 46b in the second group. In particular, the connecting bracket 44 has a generally U-shaped cross-section formed by two spaced apart side walls (not numbered) interconnected by a bottom wall 50 which is curved to match the configuration of a portion of a peripheral surface of the annular bypass duct wall 10. The connecting bracket 44 is mounted to the outer side of the bypass duct wall 10, and is axially positioned between and affixed to two axially spaced apart flanges 52 which extend radially and outwardly from the annular bypass duct wall 10. At least one of the connecting brackets 44 includes a mounting portion 54 with one or more mounting openings (not numbered) defined therein, extending radially and outwardly from the annular bypass duct wall 10 for connection with a mounting device of the aircraft (not shown), two of the four connecting brackets 44 have the mounting portions as shown in FIG. 2. A cavity 56 with a closed top and open bottom is provided at the middle of each of the connecting brackets 44, defined between the axially spaced apart side walls of the connecting brackets 44 and between two circumferentially spaced apart end walls 58. The two circumferentially spaced apart end walls 58 extend divergently from each other, substantially in the tangential directions corresponding to those of the two adjacent link rods 46 (one rod 46a and the other rod 46b) which are connected to the said connecting bracket 44.

The tangential link rods 46 form a short circuit across the annular bypass air passage 30 to transfer the core portion related inertia-induced loads from the MTF 28 to the connecting brackets 44 and the bypass duct wall 10.

The link rods 46 function as an effective load path to the rear mounting assembly 40 for inertia-induced loads originating from the core portion 13, thus reducing core deflections from that source (inertia-induced meaning loads from gravity or acceleration). The core portion 13 is therefore supported at both mount planes represented by lines 36, 42, rather than the "cantilever" mount of FIG. 9 which does not support the core portion 13 at the rear and hence causes core droop effect.

It should be noted that if only engine thrust is applied to the structure of an engine which is of a rear core mount as shown in FIG. 10, the center of the bypass would shift laterally from the center of the engine core. This is because the core is bending like a simply supported beam and has a certain amount of bending rotation at the front mount. This rotation is then carried through to the bypass flange at the outside of the intermediate case and gives a slope to the bypass relative to the core, which in turn leads to a lateral shifting of bypass center relative to the core center at the rear mount. In contrast, the rear mounting assembly 40 of this embodiment adds in the link rods 46, and moves the rear mount reaction point to the bypass duct wall 10. This relative centerline shift associated with the rear core mount of FIG. 10, is largely prevented by the tie-up with the link rods 46. The bypass duct wall 10 is a stiffer load path than the core portion 13, and thus the bypass duct wall 10 rather than the core portion 13, carries the bulk of the moment produced by the rear mount reaction, thereby reducing carcass bending of the core portion 13.

A plurality of openings 60 in the annular bypass duct wall 10 are provided aligning with the cavities 56 of the respective connecting brackets 44, in order to allow the outer end of each link rod 46 to access the cavity 56 in the connecting bracket 44 mounted to the outside of the bypass duct wall 10, from the inside of the bypass air passage 30. The inner ends of the two adjacent link rods 46 are secured to the circumferentially spaced end walls 58 of each connecting bracket 44 by means of screw fasteners (not numbered), respectively.

Each of the link rods 46 may have an aerodynamic profile in cross-section (see FIG. 5), defined with side surfaces 62 extending between a leading edge 64 and a trailing edge 66 with respect to the bypass air passage 30 of the engine. The cross-sectional profile of the link rod 46 may have a dimension "C" between the side surfaces 62 smaller than a dimension "X" between the leading and trailing edges 64, 66 in order to reduce air pressure loss in the bypass air flow 32 caused by the link rods 46. A hollow configuration of the link rod 46 may also be an option.

The tangential link rods 46 may be connected at their inner ends directly to the MTF 28 or by means of any type of connector assemblies. For example, the link rods 46 are usually fabricated in a same length for manufacturing economy and installation mistake-proofing. Therefore, an additional adjustability feature may be required to accommodate the eccentric condition of the bypass duct wall 10 and the MTF 28 of the core portion 13 caused by manufacturing and assembly tolerances thereof. Therefore, the tangential link rods 46 may be connected to the MTF 28 by means of a lockable adjustment device 68 which is able to maintain the link rod 46 in the correct orientation to the flow.

Referring to FIGS. 1-2 and 5-7b, the lockable adjusting device 68 includes at least one pin 70 and a connecting base 72 to connect at least one link rod 46 to the MTF 28. In the embodiment shown in FIGS. 2 and 6, two pins 70 are provided to each connecting base 72 such that each connecting base 72 can connect two adjacent link rods 46 to the MTF 28 (one rod 46a and the other rod 46b). For convenience and precision of description, only one pin 70 and its connection to the connecting base 72 is described. It should be noted that the other pin 70 and its connection to the same connecting base 72 is substantially the same.

Figure 6:
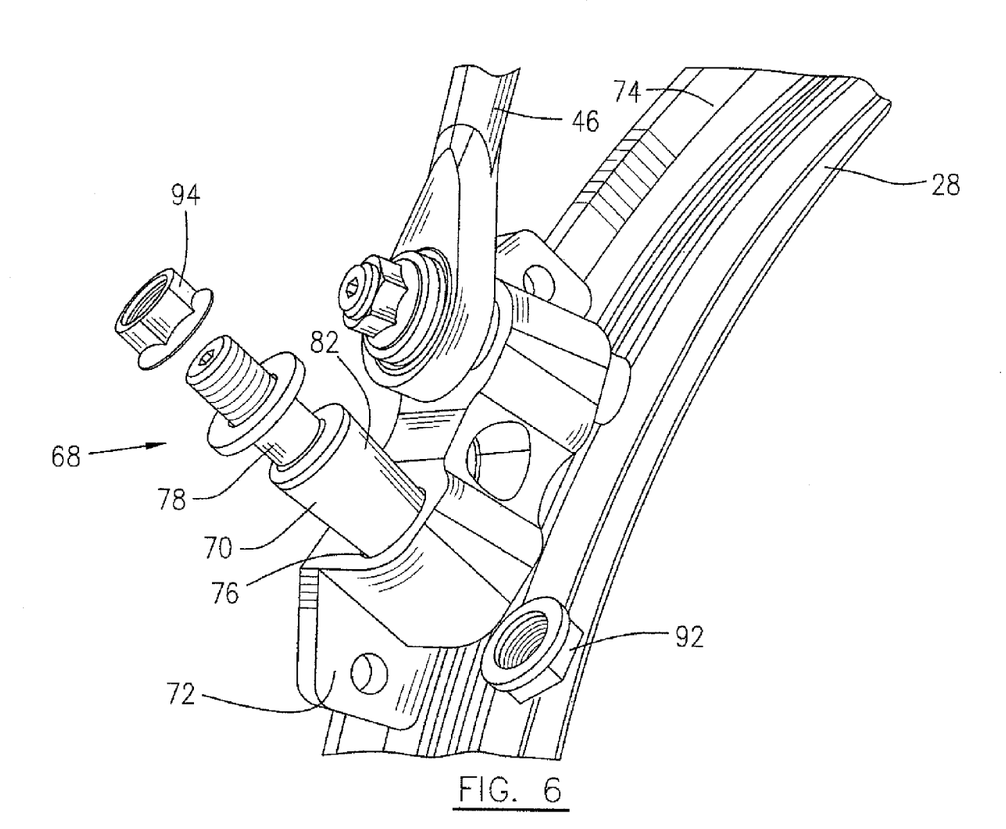
FIG. 6 is a partial perspective view (partially exploded) of the rear mounting assembly of FIG. 2 in an enlarged scale, showing a lockable adjustment device for connection of the link rods to a mid turbine frame (MTF) of a core portion of the engine.
Figure 7A:
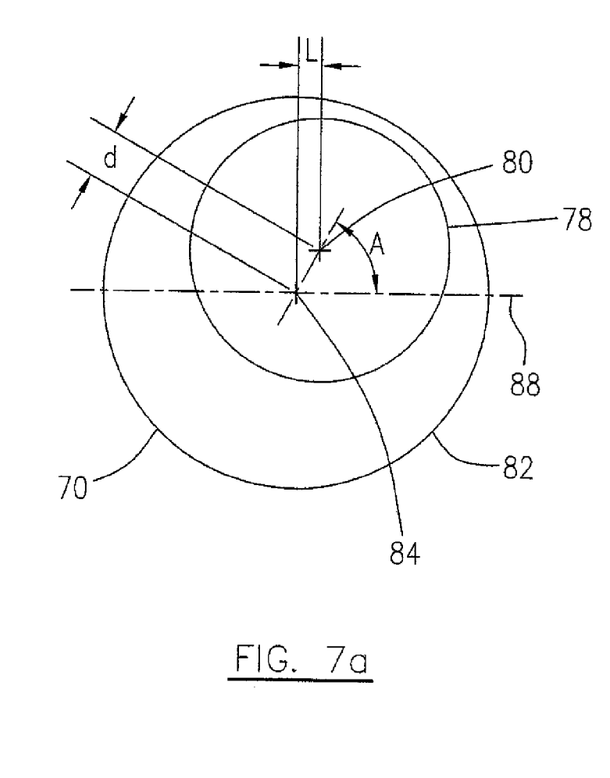
FIG. 7a is a top plan view of a pin used in the lockable adjustment device of FIG. 6, showing an annular position of an eccentric distance between the central axes of the respective connecting section and base section of the pin.
Figure 7B:
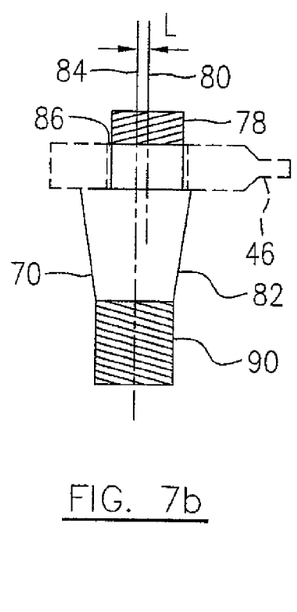
FIG. 7b is a side elevational view of the pin in FIG. 7a with a connected inner end of a link rod shown in broken lines.

The connecting bases 72 are circumferentially spaced apart and attached to the core portion 13, for example to a flange 74 radially and outwardly extending from the MTF 28 of the core portion 13. Each of the connecting bases 72 defines two holes 76 extending substantially radially therethrough. The pin 70 includes a connecting section 78 with a central axis 80 and a base section 82 with a central axis 84. The central axis 80 of the connecting section 78 is eccentric to the central axis 84 of the base section 82, at an eccentric distance "d". The connecting section 78 is received in a hole 86 of a link rod 46 (FIG. 7b), and the base section 82 is received in one of the holes 76 defined in the connecting base 72 (FIG. 6). Therefore, an angular position "A" of the eccentric distance d with respect to a direction represented by line 88 which is parallel to the connected link rod 46, may be selected by rotating the pin 70 before the pin 70 is locked in position to secure the rod 46 to the connecting base 72. When the angular position A of the eccentric distance d changes within 180 degrees, a link length "L" which is measured in the direction of line 88 (or in the direction of the connected link rod 46) will change in a range of d×2.

The base section 82 of the pin 70 and the hole 76 defined in the connecting base 72, may be tapered complimentarily to each other. The pin 70 may further have a threaded section 90 extending from the small end of the tapered base section 82, for engagement with a locking nut 92 such that the tapered base section 82 of the pin 70 is secured within the tapered hole 76 of the connecting base 72 to lock the selected angular position of the pin 70 when the locking nut 92 is tightly engaged with the threaded section 90. The base section 82 of the pin 70 and the hole 76 of the connecting base 72 may be tapered in an angle smaller than a self locking tapering angle such that the eccentric pin 70 is self-locked with the connecting base 72 against the rotation resulting from offset loads (torque) introduced by the link rods 46 even if the locking nut 92 accidentally loosens from engagement with the threaded section 90.

The connecting section 78 may further have a threaded end portion (not numbered) for engagement with a second locking nut 94 with a washer (not numbered) to prevent the connected link rod 46 from disconnecting from the connecting section 78 of the pin 70.

The pin 70 may further define a hexagonal recess (not numbered) defined in the end of the connecting section 78 as a means to rotate and hold the pin to maintain the selected angular position of the pin 70 while tightening the nut 92. The lockable adjustment device 68 provides a compact configuration to ensure the concentricity of the bypass duct wall 10 and the MTF 28. This compact configuration can be conveniently attached to the MTF 28 and located outside of the annular bypass air duct 30. The adjustment of the eccentric pin 70 does not affect the orientation of the aerodynamic profile of the link rods 46 in the bypass air flow 24. The self-locking tapering feature of the eccentric pin 70 provides a level of mistake-proofing in the field. Furthermore, there is no need to re-adjust the pins 70 once the engine is assembled, and the link rods 46 may be freely removed and re-installed in the field for maintenance purposes because the connecting base 72 which receives the respective link rods 46 is independently affixed to the MTF flange 74, thereby maintaining the adjustment.

Figure 8:
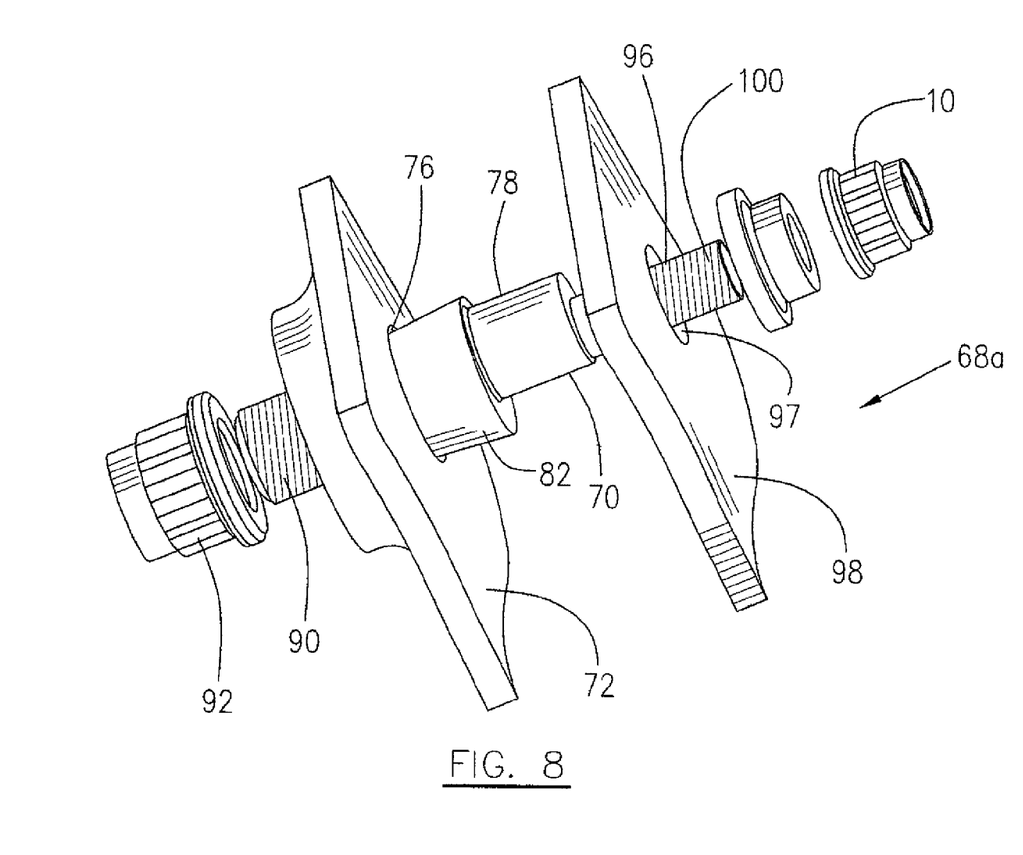
FIG. 8 is a perspective view of a lockable adjustment device according to another embodiment.

FIG. 8 shows a lockable adjustment device 68a according to another embodiment in which similar components and features are indicated by numerals similar to those used for the lockable adjustment device 68 of FIG. 6 for ease of description. The difference between devices 68 of FIGS. 6 and 68a of FIG. 8, lies in that the pin 70 of adjustment device 68a further includes an extension 96 extending from the connecting section 78 and is concentric with the base section 82. The extension 96 is received in a hole 97 defined in a supporting member such as a plate 98. After the pin 70 is locked in its adjusted position in the connecting base 72 and an inner end of a link rod 46 is attached to the connecting section 78 of the pin 70 (similar to that shown in FIG. 7b), the plate 98 is attached to the extension 96 of the pin 70 by receiving the extension 96 to extend through the hole 97 therein. The plate 98 is then affixed by fasteners (not shown) to the connecting base 72 or to the MTF 28. The extension 96 may optionally have a threaded end portion 100 such that the locking nut 94 with a bushing (not numbered), may be used to further secure the plate 98 to the pin 70. The lockable adjustment device 68a provides the connecting base 72 and plate 98 as two spaced apart support elements flanking the connecting section 78 which connects the link rod 46, thereby forming a double-shear version of an adjustable pin connecting arrangement, in contrast to the device 68 of FIG. 6 which is a single-shear version of an adjustable pin connecting arrangement.

It should be understood that a support-link lockable adjustment arrangement as illustrated by devices 68 or 68a is described as a part of a support link of a mounting system for a long duct mixed flow (LDMF) turbofan gas turbine engine in the above-described embodiments. However this support-link lockable adjustment arrangement may be applicable to support links of other types for interconnecting an annular outer case and an annular inner case of a gas turbine engine. This compact cam-type of support-link lockable adjustment arrangement can be used at either end of the link in its attachment to an outer case or an inner case, conveniently located outside of the annular bypass air duct. This support-link lockable adjustment arrangement may be used with tangential links as described in this application, or with radial support links. The eccentric pin may extend either in a substantially radial direction as described in the embodiments or may extend in a substantially axial direction.

The above description is meant to be exemplary only, and one skilled in the art will recognize that changes may be made to the embodiments described without departing from the scope of the concept disclosed. For example, the short circuit for transferring inertia-induced loads directly from the MTF to the bypass duct casing may be configured differently from the particular embodiments described above and may be applicable to any bypass duct gas turbine engine different from the engine as described. The mounting assembly incorporated with the connector for connecting the link rods to the bypass duct wall may be configured differently form the described embodiments of the connecting brackets. Still other modifications which fall within the scope of described concept will be apparent to those skilled in the art, in light of a review of this disclosure, and such modifications are intended to fall within the appended claims.

What is claimed is:

1. A turbofan gas turbine engine comprising:
a front mounting assembly attached to an annular bypass duct wall at a front axial position close to an inlet of a bypass air passage defined radially between the bypass duct wall and a core portion of the engine, the core portion being supported within the bypass duct wall by the front mounting assembly;
a rear mounting assembly having a mounting apparatus affixed to the bypass duct wall at a rear axial position adjacent to an outlet of the bypass air passage, the rear mounting assembly including a plurality of rods having opposed inner and outer ends, the rods lying substantially tangential to the core portion of the engine and extending across the bypass air passage, the rods interconnecting the bypass duct wall and a mid turbine frame (MTF) of the core portion to form a load transfer path from the core portion to the bypass duct wall for normal engine operation; and wherein the bypass duct wall includes two axially spaced flanges, radially and outwardly extending from the bypass duct wall, a plurality of circumferentially spaced apart connecting brackets being attached to the bypass duct wall and positioned axially between and affixed to the two flanges, the rods being connected at the outer ends thereof to the bypass duct wall by the connecting brackets.

2. The engine as defined in claim 1 wherein at least one of the connecting brackets comprises a mounting portion with at least one mounting opening defined therein to form said mounting apparatus.

3. The engine as defined in claim 2 wherein the connecting brackets are accessible from an inside of the bypass air passage through respective openings defined in the bypass duct wall for connection with the respective rods.

4. The engine as defined in claim 2 wherein the mounting portion of the at least one connecting bracket extends radially and outwardly from the annular bypass duct wall.

5. The engine as defined in claim 1 wherein each of the rods is connected at the inner end thereof to the MTF by an adjustable connecting device in order to ensure a concentricity of the bypass duct wall and the core portion.

6. The engine as defined in claim 2 wherein the rods comprise a first group of rods extending from the outer end to the inner end thereof in substantially tangential directions to the core portion, corresponding to a first circumferential direction and a second group of rods extending from the outer end to the inner end thereof in substantially tangential directions to the core portion, corresponding to a second circumferential direction opposite to the first circumferential direction.

7. The engine as defined in claim 6 wherein each of the connecting brackets connects with one rod of the first group and one rod of the second group.

8. The engine as defined in claim 1 wherein each of the rods has an aerodynamic profile defined by side surfaces extending between leading and trailing edges with respect to the bypass air passage, the profile having a dimension between the side surfaces smaller than a dimension between the leading and trailing edges.

9. A turbofan gas turbine engine comprising:
a core portion including at least first and second turbine assemblies, and a mid turbine frame (MTF) positioned axially between the first and second turbine assemblies;
an annular bypass duct wall surrounding and supporting the core portion, to thereby define a bypass air passage radially between the core portion and the bypass duct for directing a bypass air flow passing therethrough;
means for transferring core portion related inertia-induced loads from the MTF in a short circuit across the bypass air passage in a radial plane defined by the MTF to the bypass duct wall during normal engine operation, thereby reducing distortion of the core portion caused by the inertia-induced loads and reducing carcass bending of the core portion; and
wherein the annular duct wall includes two axially spaced flanges radially and outwardly extending from the annular bypass duct wall, a plurality of circumferentially spaced connecting brackets being attached to an outer side of the bypass duct wall, the connecting brackets being axially positioned between and affixed to the two flanges.

10. The turbofan gas turbine engine as defined in claim 9 wherein the means transfers the core portion related inertia-induced loads directly to an axial location of the bypass duct wall substantially determined by a vertical rear mounting plane of the engine, the rear mounting plane being located close to an outlet of the annular bypass air passage with respect to a substantially vertical front mounting plane of the engine which is located close to an inlet of the bypass air passage.

11. The turbofan gas turbine engine as defined in claim 10 wherein the means comprises a plurality of rods having opposed inner and outer ends lying substantially tangential to the core portion and extending across the annular bypass air passage, and the outer ends of respective rods being connected to the annular bypass duct wall by means of the connecting brackets and the inner ends of the respective rods being connected to the MTF, the rods thereby forming said short circuit.

12. The turbofan gas turbine engine as defined in claim 11 wherein each of the connecting brackets is connected to two adjacent rods.

13. The turbofan gas turbine engine as defined in claim 11 wherein the means further comprises a plurality of circumferentially spaced connecting bases attached to the MTF for connecting the inner ends of the respective rods, each connecting base being connected to two adjacent rods.

14. The turbofan gas turbine engine as defined in claim 11 wherein the rods comprise a first group of rods extending from the outer ends to the inner ends thereof in substantially tangential directions to the core portion, corresponding to a first circumferential direction and a second group of rods extending from the outer ends to the inner ends thereof in substantially tangential directions to the core portion, corresponding to a second circumferential direction opposite to the first circumferential direction.

15. The turbofan gas turbine engine as defined in claim 12 wherein the connecting brackets are accessible from an inside of the bypass air passage through respective openings defined in the bypass duct wall for connection with the respective rods.

16. The turbofan gas turbine engine as defined in claim 15 wherein at least one of the connecting brackets comprises a mounting portion with at least one mounting opening defined therein, the mounting portion extending radially and outwardly from the annular bypass duct wall.

17. The turbofan gas turbine engine as defined in claim 13 wherein each of the rods is connected at the inner end thereof to the MTF by a single pin attached to one of the connecting bases.

* * * * *